United States Patent [19]

Roth

[11] Patent Number: 4,858,796

[45] Date of Patent: Aug. 22, 1989

[54] VEHICLE TRAY

[76] Inventor: Charles S. Roth, 31505-5 Lindero Canyon Rd., Westlake Village, Calif. 91361

[21] Appl. No.: 178,543

[22] Filed: Apr. 7, 1988

[51] Int. Cl.[4] .......................... B60R 7/00; B60N 3/10
[52] U.S. Cl. ................................ 224/42.44; 224/901; 108/46
[58] Field of Search ..................... 224/42.43, 42.45 R, 224/42.45 A, 42.44, 42.46 R, 42.46 A, 42.46 B, 275, 282, 901; 108/44, 46, 47, 134, 135; 248/205.2; 211/88

[56] References Cited

U.S. PATENT DOCUMENTS 1,891,180 12/1932 Ravlin .................................. 108/46
3,164,109 1/1965 Atkinson .............................. 108/44

Primary Examiner—Henry J. Recla
Assistant Examiner—J. Casimer Jacyna
Attorney, Agent, or Firm—Timothy T. Tyson

[57] ABSTRACT

A vehicle tray is provided for mounting on the inside of a door by hooking the outer end of the tray onto the door between the window and the inner door panel and rotating an arm down from the bottom of the tray to a fastener means previously attached to the inner panel. The fastener means is a hook fastener material cooperating with a loop fastener material such as sold under the trademark Velcro ® with one portion on the door and one portion on the arm. A rotating face on the arm aligns with the plane of the inner door panel allowing optimal contact between the two fastener materials.

4 Claims, 4 Drawing Sheets

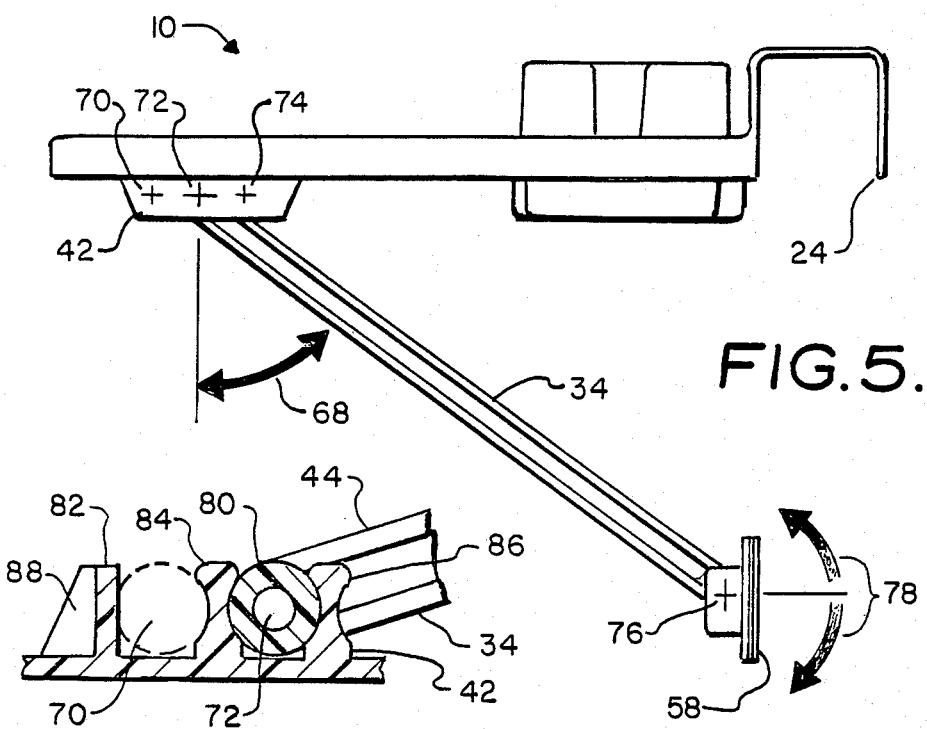
FIG. 5.
FIG. 6.
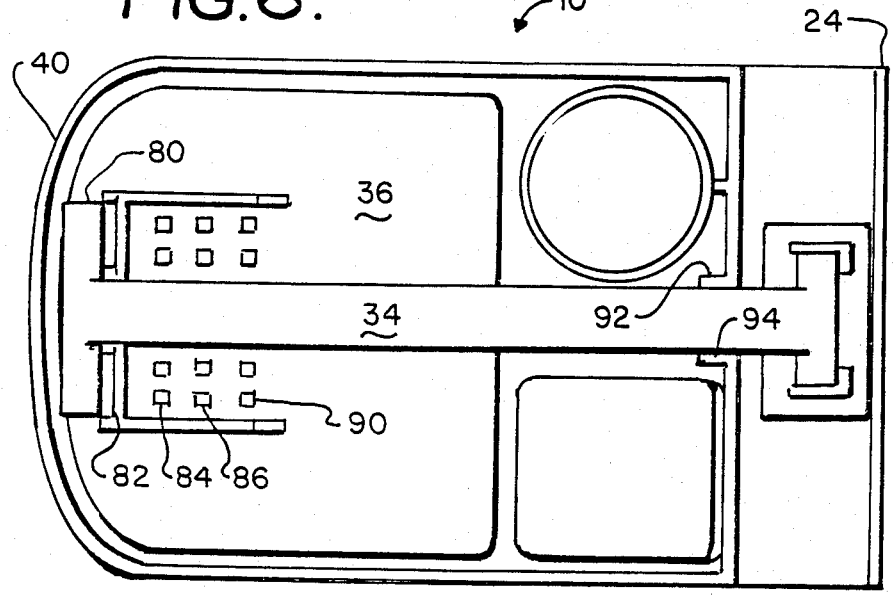
FIG. 7.

VEHICLE TRAY

TECHNICAL FIELD

The present invention pertains to the horizontally supported planar surface art, and more particularly, to a tray for mounting on the door of a vehicle.

BACKGROUND ART

Virtually everyone has had the occasion to eat, drink, and perform other tasks requiring the use of small objects in vehicles such as automobiles and trucks. Special indentations in the center consoles, dashboards, and glove compartment doors are often provided by the manufacturers as special spaces for holding food, drinks, and other objects. However, the spaces are often unsatisfactory or the particular vehicle is not provided with special spaces. The use of the floor is a poor alternative because of a lack of lateral retention of the objects and poor sanitation.

Several trays have been developed for use in automobiles as disclosed in U.S. Pat. Nos. 2,825,611 and 3,606,112 which require special installations in conjunction with the dashboard, 2,986,438 which sits on the drive line hump, and 3,864,031 which sits on the front seat center arm rest and passes back through between the two front seats to the rear seat. Other trays used in some drive-in restaurants hang on the slightly raised door window and rest against the outside of the door on a leg locked in an extended downward position. Trays for use inside the vehicle not requiring special installations or not resting on existing surfaces would provide significant advantages.

DISCLOSURE OF INVENTION

The present invention is directed to a vehicle tray for mounting on the inside of a door by hooking the outer end of the tray onto the door and rotating an arm down from the bottom of the tray to a fastener means previously attached to the inner panel of the door. The outer end hooks either into the space between the window and the inner door panel or onto a partially raised window. Rotation of the arm allows the arm to be folded flat against the bottom during storage.

In accordance with one important aspect of the invention, the fastener means includes a first fastener portion on the arm which removably attaches to a second fastener portion permanently attached to the door. In a preferred embodiment, the fastener means is a hook fastener material cooperating with a loop fastener material such as sold under the trademark Velcro ®. The door end of the arm also includes a rotating face carrying the first fastener portion which easily aligns with the plane of the inner door panel.

In accordance with another important aspect of the invention, the arm is removably mounted in the arm mounting means allowing the arm to be removed for storage of the tray. In addition, the arm mounting means has several arm mounting locations spaced at different lengths from the hook. The different arm mounting locations on the bottom of the tray allow the door end of the arm to be mounted at different locations on the inner door panel while retaining the working tray surface in a horizontal portion.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 5 is a right side elevational view;

FIG. 6 is a sectional view through the swivel area of FIG. 5;

FIG. 7 bottom plan view with the arm stored; and;

MODES FOR CARRYING OUT THE INVENTION

Figure 1:
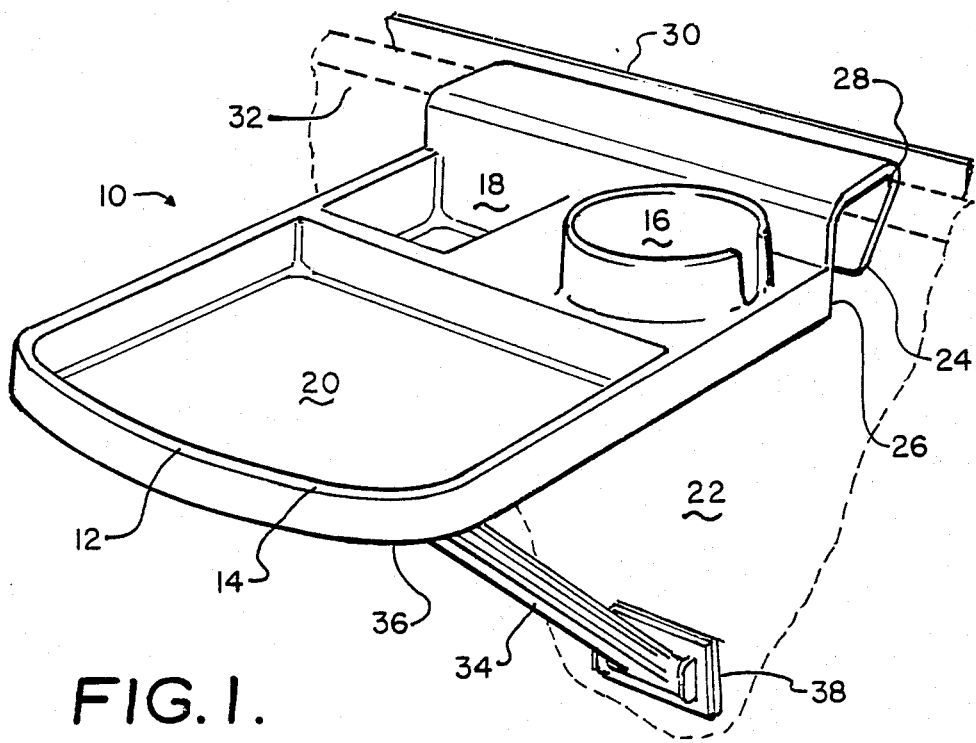
FIG. 1 is a front, top, and right side perspective view of a vehicle tray in accordance with the present invention.

Referring initially to FIG. 1, there is illustrated a front, top, and right side perspective view of a vehicle tray, generally designated 10, of the present invention. The top 12 of the horizontal member 14 on which the food, drinks, or other small objects are to be placed is divided up into several specialized section: a cup or drink holder 16, a small receptacle 18 for french fries or the like, and a large receptacle 20 for larger items. Ribs between and around the horizontal surfaces of these areas keep objects placed thereon from sliding around as the vehicle moves.

The tray 10 is retained on a door 22 by placing a hook means 24 on the outer end 26 of the horizontal member 14 into the space 28 between a window 30 and the inner door panel 32 or onto the partially raised window. The tray is braced on the door by an arm 34 that rotates down from the bottom 36 of the tray to the door. A fastener means between the inner door panel 32 and the door end 38 of the arm keeps the arm from sliding down the door.

Figure 2:
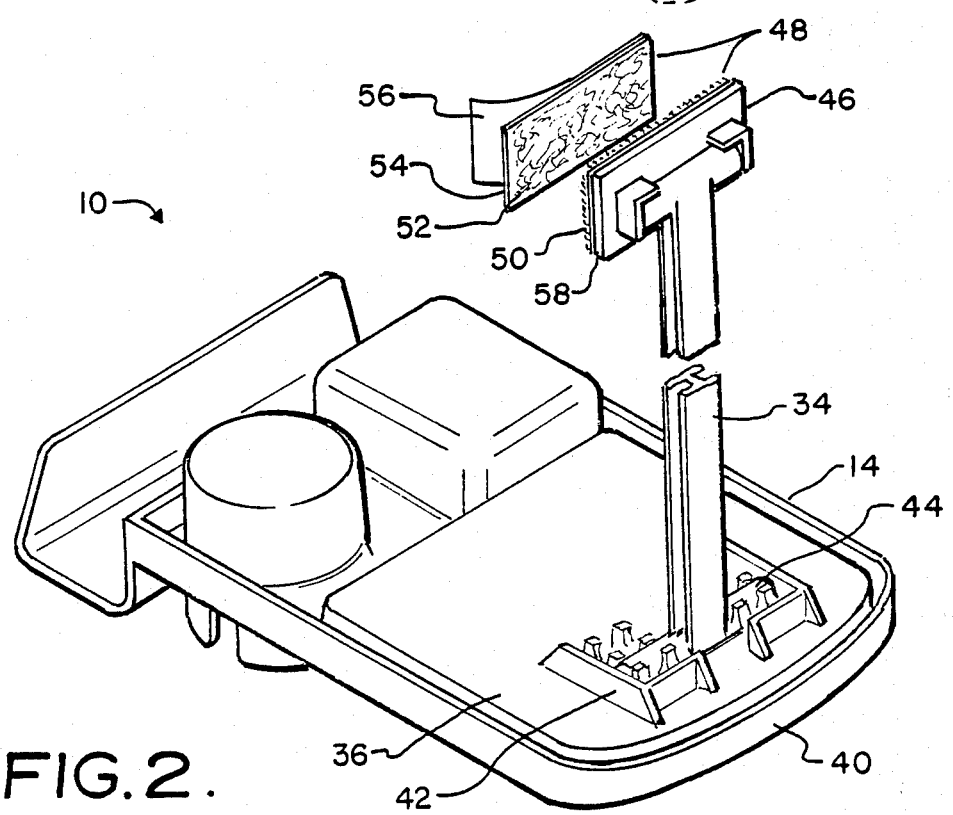
FIG. 2 is a front, bottom, and rights side perspective view of the vehicle tray.

FIG. 2 is a front, bottom, and right side perspective view of the vehicle tray 10. Adjacent the inner end 40 on the bottom 36 is an arm mounting means 42 for rotatably and detachably mounting the arm 34 on the horizontal member 14. The arm has a tray end 44 and a door end 46. The tray end is held in the arm mounting means and the door end abuts the door. The fastener means 48 is shown in FIG. 2 as having a first fastener portion 50 on the door end 46 and a second fastener portion 52 for permanently attaching to the inner door panel 32. The fastener means includes a hook fastener material cooperating with a loop fastener material such as sold under the trademark Velcro ® with either the hook material or the loop material being the first fastener portion on the door end 46 of the arm 34 and the other material being the second fastener portion on the inner door panel 32. Preferably the material on the door is the loop material since it does not retain lint and is always visible when the tray 10 is not in position on the door. The second fastener portion 52 has an adhesive backing 54 covered by protective paper 56 prior to use. The portion 52 is applied to the door by removing the protective paper and pressing it on the inner door panel 32 (FIG. 1). A comparison of the door end 46 of the arm 34 in FIGS. 1 and 2 shows that the end has a rotating face 58 carrying the first fastener portion 50. The rotating face 58 allows the plane of the face to match the plane of the door inner panel 32 permitting maximum contact between the first and second fastener portions 50 and 52.

Figure 3:
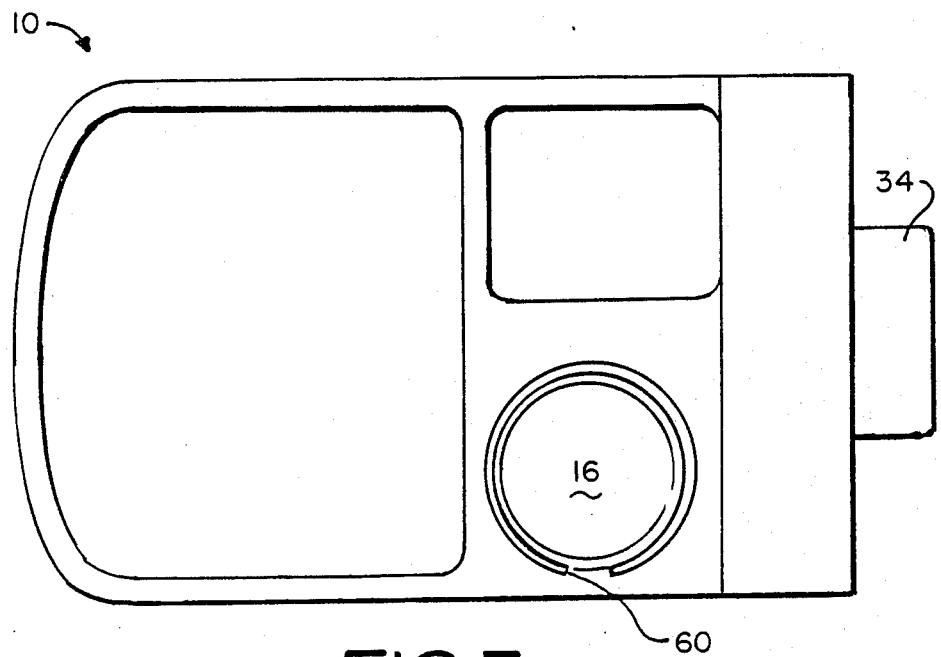
FIG. 3 is a top plan view.

FIG. 3 is a top plan view of the tray 10 with the arm 34 folded flat against the bottom for storage. A slot 60 in the side of the drink holder 16 allows a cup to be positioned therein with the handle jutting out the slot.

Figure 4:
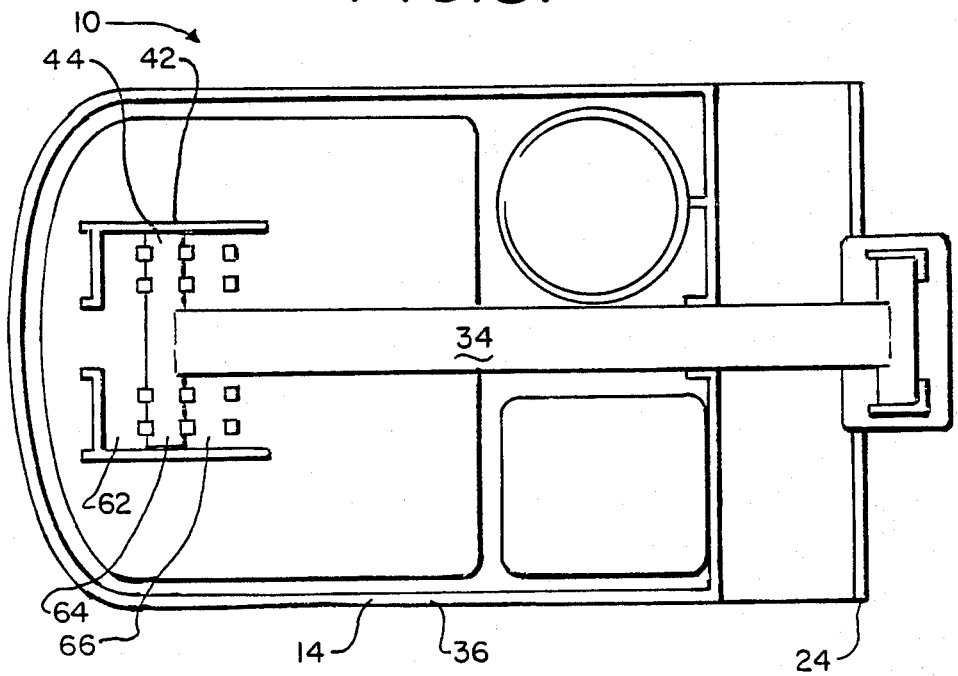
FIG. 4 is a bottom plan view.
Figure 8A:
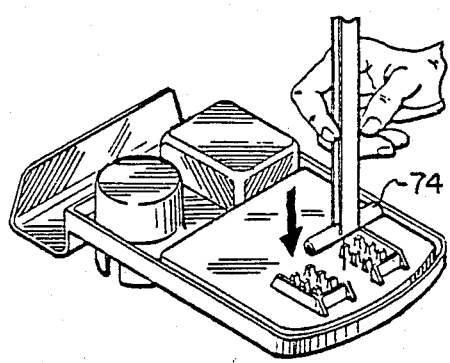
FIG. 8 is a series of views showing installation of the vehicle tray.
Figure 8D:
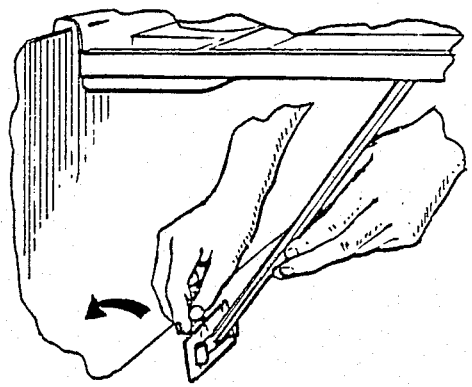
Figure 8B:
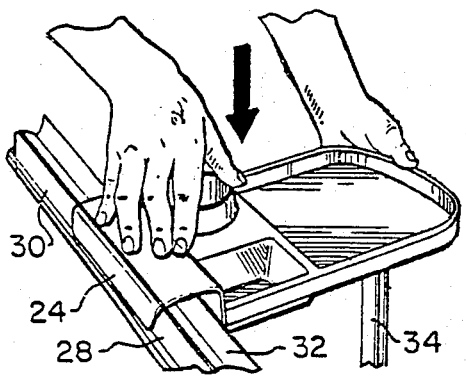
Figure 8E:
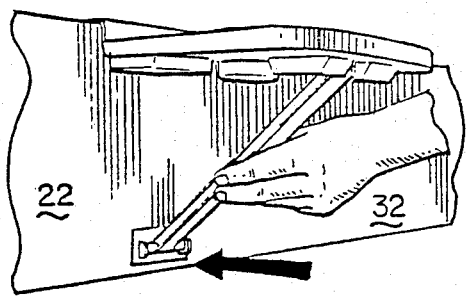
Figure 8C:
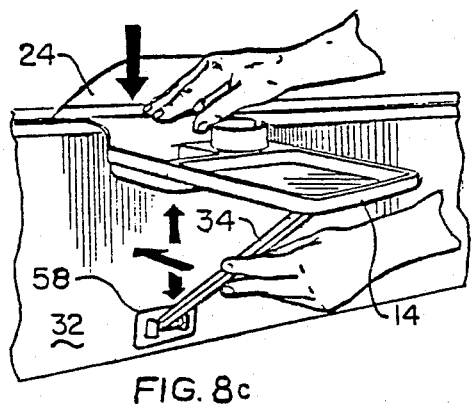
Figure 8F:
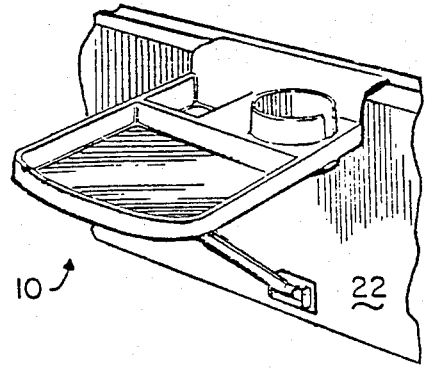

FIG. 4 is a bottom plan view of the tray 10 with arm 34 folded flat against the bottom 36 for storage. As noted in conjunction with FIG. 2, the arm 34 is removably mounted in the arm mounting means 42. A plurality of arm mounting locations 62, 64, and 66 in the arm mounting means are spaced at increasing lengths from the hook means 24 and allow the tray end 44 of the arm 34 to be positioned wherever necessary to maintain the horizontal member 14 horizontally on the door 22 as shown in FIG. 1. As shown in FIG. 4, the arm 34 is mounted in the central arm mounting location 64. The three different locations for mounting the arm accommodate various thicknesses in different vehicles between the inner door panel 32 and the space 28 at the window. This versatility also overcomes any problems of arm rests, ash trays, and decorative features on doors.

FIG. 5 is a right side elevational view illustrating the initial positioning of the arm 34 and the rotating face 58 on the tray 10 prior to installation on a door. The arm 34 is positioned in the central arm mounting location 64 (FIG. 4) and rotates about the arm mounting means 42 as shown by the arrows 68 with the axis of the rotation being represented by the center plus mark of the three pluses 70, 72, and 74. The other two plus marks show the axes of rotation of the arm 34 at the two other arm mounting locations 62 and 66 (FIG. 4). The rotating face 58 rotates on the arm 34 about the axis represented by the plus mark 76 as shown by the arrows 78. The plane of the rotating face 58 is made to be the same as the plane of the inner side of the hook means 24. If the door is of such a type allowing the set-up shown in FIG. 5, the tray 10 is then mounted on the door.

FIG. 6 is a sectional view through the swivel area of FIG. 5 at the axes 70 and 72. The tray end 44 of the arm 34 has a cylindrical portion 80 that mounts between snap receivers 82, 84, and 86 of the arm mounting means 42. To remove the arm 34 from between the two receivers 84 and 86, the cylindrical portion 80 is simply lifted up causing the receivers to bend apart slightly. The cylindrical portion 80 then be reinserted by pushing it down to snap between the two receivers 84 and 86 or at the alternate position represented in dotted outline between the receivers 82 and 84. It should be noted that the receiver 82 does not move being braced by a rib 88.

FIG. 7 is a bottom plan view with the arm 34 removed and stored fully within the outer dimensions of the tray, i.e. between the inner end 40 and the hook means 24. When the cylindrical portion 80 of the arm 34 is removed from the receivers 82, 84, 86 and 90 on the bottom 36, the arm is retained with the tray 10 by two clips 92 and 94 which snap onto the sides of the arm 34.

FIG. 8 is a series of views showing installation of the vehicle tray 10 on a door 22. In FIG. 8a, the cylindrical portion 74 is inserted into one of the sets of snap receivers. In FIG. 8b, the hook means 24 is inserted into the space 28 between the window 30 and the inner door panel 32. As can be seen on the right side of this figure, the arm 34 is hanging straight down due to gravity. In FIG. 8c, the hook means 24 is pushed down with one hand as the arm 34 is pushed against the inner door panel 32. If the rotating face 58 of the arm 34 appears to be in a suitable location on the inner door panel and the horizontal member 14 is horizontal, the fastener means is in position for being permanently attached to the door. In FIG. 8d the protective paper is being removed from the adhesive surface of the fastener means as described in conjunction with FIG. 2. In FIG. 8e, the exposed adhesive surface is pressed against the inner door panel 32 permanently attaching the second fastener portion to the door 22. In FIG. 8f, the tray 10 is shown in its final position on the door 22 ready for use.

In view of the above, it may be seen that a vehicle tray is provided which is mounted securely on the inside of the door for use and is then easily removed and folded for storage. In addition, a vehicle tray is provided which may be easily adapted for use on a variety of doors. Of course, the structure may be variously implemented depending upon specific applications. Accordingly, the scope hereof shall not be referenced to the disclosed embodiments, but on the contrary, shall be determined in accordance with the claims as set forth below.

I claim:
1. A vehicle tray comprising:
a horizontal member having an outer end, an inner end, a top, and a bottom;
a hook means coupled to said outer end for hooking either into the space between a window and an inner door panel of a vehicle or onto a partially raised window;
arm mounting means on said bottom;
an arm having a tray end and a door end, said tray end rotatably mounted in said arm mounting means; and
a fastener means having a first fastener portion on said door end and a second fastener portion for permanently attaching to said inner door panel, said fastener means removably retaining said door end of said arm on said inner door panel.

2. A vehicle tray according to claim 1 wherein said door end of said arm includes a rotating face carrying said first fastener portion.

3. A vehicle tray according to claim 1 wherein said fastener means includes a hook fastener material cooperating with a loop fastener material, said first fastener portion having one of said hook and loop fastener materials and said second fastener portion having the other of said hook and loop fastener materials.

4. A vehicle tray according to claim 1 wherein said arm is removably mounted in said arm mounting means and said arm mounting means includes a plurality of arm mounting locations spaced at a plurality of lengths from said hook means.

* * * * *